United States Patent Office 3,446,707
Patented May 27, 1969

3,446,707
COATING MALT WITH GELATINIZED STARCH
Clifford M. Hollenbeck, Manitowoc, and Ned W. Kochorosky, Two Rivers, Wis., assignors, by mesne assignments, to North American Corporation, Milwaukee, Wis., a corporation of Delaware
No Drawing. Filed Nov. 17, 1966, Ser. No. 595,020
Int. Cl. C12c 1/04; C12g 3/00
U.S. Cl. 195—70          8 Claims

ABSTRACT OF THE DISCLOSURE

A process of increasing the size of malt kernels made from the thinner grades of barley having an extract below 76.5%. The size of the kernels is increased by applying a coating of gelatinized starch to the thin kernels prior to kilning.

---

This invention relates to the production of malt. More particularly, this invention is concerned with a process of producing malt from thin or small-sized barley kernels, and the resulting product.

Malt is an essential ingredient in the production of alcoholic beverages, such as beer, ale, malt liquor and related beverages. The quality of the malt employed must meet rigid standards set by the brewers. One of the most important requirements of the brewer is that the amount of extract in the malt be high. Malt extract is usually referred to as the percentage of extractable dry matter in the malt which passes into solution during mashing in the brewing process. Other factors being equal, the malt extract will vary according to the thinness or plumpness of the malt kernels. The relationship between plump and thin malt kernels and the extract obtained therefrom can be arbitrarily shown in a representative manner as follows:

|   |       | Percent extract |
|---|-------|-----------------|
| A.| plump | 77.5            |
| B.|       | 76.5            |
| C.| ↓ to  | 75.5            |
| D.| thin  | 72.0            |

The reduction in extract yield with decrease in malt kernel size from plump down to thin kernels, in malts which are equally well-modified, is due primarily to the higher percentage which the husk bears to the total weight of the malt kernels in thin malt compared to the percentage weight of the husk in plump kernels. It is readily seen that by obtaining plump barley malt, the brewer obtains a product with higher extract yield than he would obtain from malt kernels of smaller size. The brewers' constant concern with obtaining a malt with high extract yield is primarily because brewing of beer and ale utilizes essentially only those ingredients which are soluble in the wort. Materials in malt which do not dissolve contribute essentially nothing to the production of the final product, except as an inert filter bed during the separation of the wort after mashing.

The size of the malt kernels, whether they be plump, thin or of intermediate size, depends on the size of the barley kernels which are malted. The size of the resulting malt kernel increases proportionately with increase in size of the barley kernels which are malted. Accordingly, to produce plump malt kernels, one should employ plump barley kernels. Unfortunately, the available supply of barley in plump grades varies year-to-year, with perhaps only one out of four barley crop years in the United States giving large amounts of high quality plump kernels. In such good years, a large percentage of the barley crop may grade A and B with small proportions in the C and D grades, according to the arbitrary scale set forth above. In three out of four years, however, the barley crop may grade smaller proportions of A and B and much more in C and D sizes, thus limiting the amount of plump barley available for malting. Plump barley normally commands a premium price, and in such years, the prices of A and B grade barleys in this arbitrary scale are high. Regardless of the crop year, the barley always contains some of the smaller kernels of sizes C and D. Grade C is generally not used in brewing because of the resulting small kernel size, but it can be and is germinated to a high diastase content and is used suitably in distillery operations. The D size thin barley is normally too small to be used for either brewery or distillery malt. It is generally sieved out and sold at reduced price primarily for livestock feed.

In addition to requiring a high extract, the brewer insists that the malt have a specified kernel-size assortment to insure proper grinding in the malt mill. This means the kernels must be within a narrow size range. If the size range is unduly broad and contains large kernels, these kernels would be ground too fine and cause a reduction in the filtering rate during lautering. If the malt kernels are too small for grinding according to the settings used by the brewers' grinders, the kernels pass through unchanged and do not contribute fully to the amount of material available for conversion in the mashing step. Because the brewer is concerned with having plump malt of a narrow kernel assortment, the maltster must often sieve out the small kernels and either malt them for distillery use or sell the small-size thin barley kernels at a lower price for non-malt uses.

Although the thinner grades of barley are rarely used presently in brewing, they have inherent potential for this purpose. The thin grades are generally of sufficient germinating power to be malted and the resulting product has the capacity to supply all of the desired qualities found in malt from plump kernels. Acceptance of malt from thin kernels requires, however, as a practical commercial consideration that the product be upgraded as to size and extract to the standards which brewers presently require. Malt from thin kernels which is upgraded as to extract and plumpness, and which can be handled by the brewers' grinding mills without alteration thereof, will undoubtedly be employed in beverage production, especially during those years when there is a shortage of plump barley and malt.

According to the present invention there is provided a process of increasing the kernel size and extract yield of barley malt which comprises applying gelatinized starchy material to the surface of green malt prior to kilning, and then kilning the malt to suitable dryness.

There is also provided a novel malt product comprising dry barley malt kernels having a dry coating thereon of gelatinized starchy material.

The process of this invention is most suitably used to upgrade malt from thin or small-sized barley. The gelatinized starch applied to the kernel surface increases its volume or size and simultaneously increases the extract potential by providing starchy material for conversion to additional water soluble brewable materials having the desirable natural properties of malt for this purpose. However, the invention also can be used, if desired, in the production of malt from plump barley kernels or any grade size barley from thin to plump.

The green malt used in the process can be produced by any conventional malting processes, or by any of the modified malting processes including those which employ gibberellic acid and other modifying materials, such as the process described in U.S. Patent No. 3,085,945 which produces malt without rootlets.

Any suitable starchy material can be used in this process, providing it is acceptable in beer, forms a smooth slurry when gelatinized and the starch and other components are converted by the malt enzymes during mashing. Flours or meals of corn, barley, wheat, rye, rice, sorghum and potato are suitable for use in this process. Soluble sugars, on the other hand, are not suitable additives in this process because they do not increase the berry or kernel size and because they tend to give too much color to the malt by their carmelization during kilning.

The starchy material used to coat the green malt kernels according to this invention is gelatinized before being applied. Gelatinizing the starchy material converts it to a form which permits it to be utilized in the mashing step of beverage production. Gelatinized barley flour, for example, is readily converted during mashing by enzymes in malt to fermentable sugars while ungelatinized barley flour would be converted only with difficulty. Coating the green malt with ungelatinized barley flour would not increase the extract yield nearly as much as does gelatinized barley flour.

Gelatinized barley flour or meal, or other starchy materials, are readily produced by mixing flours or meals with water and heating the mixture. Gelatinization is accomplished in a shorter time, and the gelatinized slurry is generally smoother and more easily applied, when the starchy material is ground into fine particles, such as to a flour, before intermixing it with water. The ratio of flour to water is not critical but sufficient water should be used to keep the resulting slurry from becoming to viscous to use. A ratio of about two pounds of barley flour, for example, advisably from thin barley, per gallon of water is often suitable.

Malt can be included in the slurry, before, during or after gelatinization to render it less viscous. The liquefying effect of malt enzymes, such as a high diastase malt, keeps the viscosity of the slurry lower. Although any suitable amount of malt can be included in the slurry, replacing about 5% of the flour with malt usually gives good results. Furthermore, when malt is included in the gelatinized slurry the resulting coated malt product of this invention often has a higher extract yield than when the malt is not included.

Any suitable temperature above the gelatinization temperature can be used to gelatinize the starchy slurry. A temperature of 70°–85° C. can be conveniently used, with or without the inclusion of malt in the slurry. The gelatinization of starches is known in the art so such information is readily available and should be employed in effecting the desired gelatinization.

Suitable materials can be added to the gelatinized starchy slurry to increase adhesion to the green malt surface. Included in the materials which can be so used are colloidal gums, and especially gum guar and locust bean gum.

The gelatinized starchy slurry can be applied to the green malt by any suitable means, including spraying or pouring the slurry onto the green malt. The slurry can be applied evenly all at once or intermittently with partial drying between applications. Regardless of the method, care should be taken to avoid making the green malt too wet and letting excess slurry drain off the malt.

The amount of gelatinized material added to the green malt can be varied as desired but generally will not exceed 15% by weight of the starting barley in the green malt stage of the malting process. Furthermore, amounts in excess of about 10% of gelatinized material have a tendency to powder off later during handling.

The gelatinized starchy material is advisably applied to the green malt in the last one-half, but more beneficially in the last one-quarter, of the germination period prior to kilning. The optimum period for application presently appears to be the last 24 hours of germination before kilning. If the slurry is added too early in the germination period it may cause mold and/or yeast growth.

To aid in control of mold and yeast growth, and to supplement the bleaching effect of the sulfur dioxide on the kiln, sodium metabisulfite can be added to, or along with, the gelatinized starch slurry. About 500 p.p.m. on the total barley weight being malted is suitable.

The coated green malt is kilned by conventional methods after germination has been completed. The resulting coated malt is characterized by increased plumpness and increased extract yield. The product is handled in the same manner and can be used by the brewer in the same way he uses ordinary malt.

The following examples are presented to illustrate the invention:

EXAMPLE 1

Samples of barley (3000 g. each) were steeped and germinated with the usual malting procedure. (This usually comprises steeping in water at 50–55° F. for 30 to 50 hours until the moisture content of the barley reaches 39–44%. The barley is then germinated 4–5 days at 60° F. with aeration.) On the fourth day of germination the following were added to individual samples of germinating barley (green malt):

(A) Control—650 ml. of water;
(B) 650 ml. of a slurry of pre-gelled barley flour containing 299 g. (about 10% of the barley now in green malt form) of a barley flour gelled by heating the slurry to 80° C., and cooling;
(C) 650 ml. of a slurry of pre-gelled barley flour containing 464 g. (about 15.4% of the barley now in green malt form) of a barley flour gelled by heating as in B;
(D) Same as C except 5% of the barley flour in the slurry was replaced by a diastatic malt flour.

The barley flour slurry of D was much easier dispersed throughout the green malt mass than either the slurries in B or C, due to the lower viscosity of the slurry as the result of the liquefying effect of the malt flour enzymes.

The treated green malt samples were germinated with aeration for 24 hours more, then dried to about 4% moisture by the usual kilning. (The usual kilning is 12 hours at 120° F., 4 hours at 140° F., 4 hours at 160° F., 2 hours at 180° F. and 2 hours at 190° F.) The extracts (dry) on the samples of malt were as follows:

| Sample: | Percent extract |
| --- | --- |
| A | 75.4 |
| B | 76.8 |
| C | 77.8 |
| D | 78.3 |

The appearance and chemical analyses of the malts were essentially normal. Sample C was less desirable appearance-wise than sample B, and the heavier flour coating tended to flake off the malt. Sample D was higher in extract than sample C due primarily to more efficient application of the slurry with its lower viscosity.

The increased extract values, due to the added barley flour, were illustrated by sample B being higher in extract than sample A, and samples C and D being higher in extract than samples B, as well as A.

EXAMPLE 2

Fifteen hundred bushels (72,000 lbs) of barley were steeped and germinated under the usual commercial malting conditions. On the fourth day of germination a slurry of pre-gelled barley flour was added to the germinating barley. The slurry contained 7200 lbs. of barley flour and 200 lbs. of diastatic malt flour in 3000 gallons of water which was heated to gelling temperature (80° C.) with stirring over a period of ten hours and then cooled. Thirty-six lbs. of sodium metabisulfite was added to the cooled barley flour slurry to inhibit yeast and mold growth in the slurry, as well as on the malt after the slurry was added. The germinating barley was aerated for about 12 hours after the flour slurry addition, then kilned in the usual manner to dryness.

The analyses (American Society of Brewing Chemists

Procedures) on the coated malt and an uncoated control (3000 gallons of water only added to green malt from 72,000 lbs. of barley on the fifth day) from the same type of barley were as follows:

|  | Control | Gelatinized barley flour added |
|---|---|---|
| Moisture (percent) | 3.6 | 4.0 |
| Extract (dry) (percent) | 75.3 | 76.2 |
| Wort color (° L.) | 1.83 | 1.81 |
| Diastase (° L.) | 132 | 144 |
| Alpha amylase (units) | 38.3 | 35.1 |
| Total protein (percent) | 13.56 | 13.55 |
| Soluble protein (percent) | 5.58 | 5.75 |
| Assortment: |  |  |
| 7/64 screen (percent) | 7.5 | 9.2 |
| 6/64 screen (percent) | 56.1 | 60.3 |
| 5/64 screen (percent) | 36.0 | 30.2 |
| Thru (percent) | 0.4 | 0.3 |

The malt with the barley flour added was 0.9% higher in extract, and the kernel size assortment was more plump than the control.

EXAMPLE 3

The addition of gelatinized barley flour can be made to a barley in conjunction with the plant hormone gibberellic acid to produce a malt with more desirable brewing properties, both from an extract standpoint and better malt modification. For example, the barley variety Campana often fails to modify properly during malting, and often gives lower than anticipated extract. The following example illustrates the improvement of the extract and modification of a sample of Campana when treated as in Example 2 with a pre-gelled barley flour slurry late in the germination period, and also treated with 0.2 p.p.m. of gibberellic acid at the end of steeping. Ten percent of barley flour was added on a barley basis in a pre-gelled slurry.

The analyses on the finished malt samples were as follows:

|  | Control | Treated with gibberellic acid and gelatinized barley flour |
|---|---|---|
| Moisture (percent) | 5.0 | 4.9 |
| Extract (dry) (percent) | 73.5 | 75.3 |
| Fine-coarse difference in extract (percent) | 3.7 | 2.3 |
| Diastase (° L.) | 146 | 132 |
| Alpha amylase (units) | 36.7 | 40.4 |
| Total protein (percent) | 14.16 | 14.38 |
| Soluble protein (percent) | 5.68 | 6.82 |

EXAMPLE 4

Gum guar was mixed into a barley flour slurry of the same concentration as in Example 3 before it was gelled. The gum guar was used at a rate of 850 p.p.m. based on dry weight of the germinating barley, or 16 g. per bushel of barley. The flour slurry was heated to 85° C. for pre-gelling the barley flour, then cooled to room temperature. The slurry was added to germinating barley as in Example 3 at a rate of two gallons per bushel of barley.

Sodium metabisulfite was added to the slurries at 500 p.p.m. on the germinating barley weight before the pre-gelled slurries were added to the green malt. The controls were as follows: (1) watered control, and (2) regular barley flour addition.

The analyses of the malt samples were as follows:

|  | Watered control | Gelatinized barley flour | Gelatinized barley flour with gum guar |
|---|---|---|---|
| Moisture (percent) | 4.4 | 4.3 | 4.5 |
| Extract (percent) | 76.5 | 77.1 | 77.6 |
| Color (° L.) | 1.67 | 1.67 | 1.67 |
| Alpha amylase (Units) | 55.8 | 48.9 | 45.6 |
| Diastase (° L.) | 156 | 140 | 140 |
| Total protein | 13.44 | 14.06 | 13.45 |
| Soluble protein | 5.42 | 5.57 | 5.64 |
| Assortment: |  |  |  |
| 7/64 sreeen (percent) | 3.5 | 4.8 | 4.9 |
| 6/64 screen (percent) | 50.7 | 53.6 | 55.6 |
| 5/64 screen (percent) | 45.6 | 41.5 | 39.4 |
| Thru (percent) | 0.2 | 0.1 | 0.1 |

The gum guar improved the adhesion of the gelatinized barley flour to the malt which was reflected in the higher extract and slightly larger kernel size for the malt with the combination, compared to the malt with only barley flour.

EXAMPLE 5

Samples of commercial green malt of 1000 g. each were taken from a regular commercial malting compartment at the end of 4 days of germination as in Example 1. To one of the samples was added, and mixed well, a slurry of pre-gelled corn starch (50 gm. of pre-gelled corn starch in 350 ml. of water). Another 1000 g. green malt sample was retained as a control. The two samples were allowed to germinate an additional 24 hours under the usual malting conditions of temperature and moisture. Then they were dried by kilning to about 4% moisture as in Example 1, and cleaned in the usual way.

The extract values on the two malts (American Society of Brewing Chemists Procedures) were 78.0% for the corn starch supplemented sample and 75.7% for the control, on a dry weight basis.

EXAMPLE 6

A series of malts were made with barley starch, wheat flour, and wheat starch as the starchy material additives. Wheat flour contains the normal protein content while wheat starch has had the protein removed.

The starchy material was pre-gelled before its application to the green malt. This was done by heating the slurry to 90° C., and then cooling it to room temperature. The water used in the slurries was an amount equivalent to two gallons per bushel of barley, and the starch was equal to 10% of the dry weight barley (176 g.). A 1% amount of malt flour based on the weight of the starchy material additive was also used along with 500 p.p.m. of sodium metabisulfite to help thin the starch slurries for easier application. The pre-gelled slurries were applied to green malt in equal amounts on the last two days of a five day germination period. The green malt was kilned, after germination, according to normal commercial practice (see Example 1).

The following malts were made in this series:
(1) Regular Control—normal malting procedure.
(2) Watered Control—watered on the last two days of germination with an equivalent of two gallons of water per bushel of barley.
(3) 10% pre-gelled barley starch.
(4) 10% pre-gelled wheat flour.
(5) 10% pre-gelled wheat starch.

Laboratory analyses of these sample malts were as follows:

|  | Malt identity | | | | |
|---|---|---|---|---|---|
|  | 1 | 2 | 3 | 4 | 5 |
| Moisture (percent) | 4.3 | 4.4 | 5.1 | 5.2 | 5.1 |
| Extract (dry) (percent) | 75.1 | 75.1 | 75.7 | 75.3 | 76.0 |
| Color (° L.) | 2.26 | 3.28 | 1.64 | 1.68 | 1.68 |
| Diastase (° L.) | 119 | 104 | 165 | 165 | 173 |
| Alpha amylase (units) | 60 | 63 | 65.3 | 63.3 | 65.3 |
| Total protein | 13.51 | 13.78 | 11.45 | 13.70 | 13.80 |
| Soluble protein | 6.30 | 6.96 | 5.03 | 5.88 | 5.67 |
| Assortment: |  |  |  |  |  |
| 7/64 screen (percent) | 3.1 | 4.1 | 9.0 | 8.4 | 7.3 |
| 6/64 screen (percent) | 25.9 | 38.3 | 55.5 | 66.4 | 53.4 |
| 5/64 screen (percent) | 70.4 | 56.9 | 34.9 | 24.0 | 38.8 |
| Thru (percent) | 0.6 | 0.7 | 0.5 | 1.2 | .05 |

The pre-gelled starch, wheat flour, and wheat starch additives increased the extract, and increased the average kernel size, of the malts in these samples.

Various changes and modifications of the invention can be made and, to the extent that such variations incorporate the spirit of this invention, they are intended to be included within the scope of the appended claims.

What is claimed is:

1. The process which comprises applying an aqueous slurry of gelatinized starch material to the surface of whole green malt from thinner grades of barley having an extract below 76.5% to form a coat on the malt kernels to increase the kernel volume and extract yield.

2. The process of claim 1 in which the gelatinized starch material is barley flour.

3. The process of claim 1 in which the coating amounts to up to 10% by weight of the dried malt.

4. The process of claim 1 in which the slurry is applied to the green malt during the last 24 hours of germination before kilning.

5. The process of claim 1 in which the slurry is applied intermittently with at least partial drying between slurry applications.

6. The process of claim 1 in which a colloidal gum is incorporated in the slurry to aid adhesion to the malt surface.

7. The process of claim 6 in which the gum is gum guar.

8. A malt product comprising whole dry barley malt kernels, from thinner grades of barley, having a dry coating thereon of a gelatinized starch material which increases the kernel volume and extract yield, said barley malt kernels without the coating having an extract below 76.5%.

References Cited
UNITED STATES PATENTS

| | | | |
|---|---|---|---|
| 2,947,667 | 8/1960 | Komm | 195—70 |
| 3,022,174 | 2/1962 | Wimmer et al. | 195—70 |
| 3,030,279 | 4/1962 | De Ryhove et al. | 195—70 |
| 3,054,676 | 4/1962 | Lauhoff et al. | 99—50 |

OTHER REFERENCES

Ross et al.: The Condensed Chemical Dictionary, pp. 995–996 and p. 1004, 1956.
Ross-Mackenzie, Brewing and Malting, pp. 48–49, 1927.
Industrial Gums, p. 328.

A. LOUIS MONACELL, *Primary Examiner.*

N. ROSKIN, *Assistant Examiner.*

U.S. Cl. X.R.

99—50